April 29, 1969      O. F. TIBBS      3,441,690
AIR-TIGHT DISTRIBUTOR CAP

Filed Feb. 15, 1967      Sheet 2 of 2

INVENTOR
OSCAR F. TIBBS

BY *Larson and Taylor*

ATTORNEYS

United States Patent Office 3,441,690
Patented Apr. 29, 1969

3,441,690
AIR-TIGHT DISTRIBUTOR CAP
Oscar F. Tibbs, Ripley, Tenn., assignor of one-half to
John W. Buzick, Monette, Ark.
Filed Feb. 15, 1967, Ser. No. 616,214
Int. Cl. H01h 19/02, 19/04
U.S. Cl. 200—19          3 Claims

ABSTRACT OF THE DISCLOSURE

A distributor for use with an ignition system of an internal combustion engine or the like, said distributor having a sealed pressure tight chamber enclosing the rotating electrode and the electrical contacts that cooperate therewith. Means for maintaining either vacuum or high pressure conditions in the chamber. A distributor cap including the chamber and designed for universal application to any existing distributor body.

FIELD OF THE INVENTION

The present invention relates to distributors for internal combustion engines, and in particular, it relates to an improved distributor cap having a sealed chamber formed therein.

DESCRIPTION OF THE PRIOR ART

In conventional distributors, caps are employed to shield the electrical contacts from dust and transient air currents. However, these shields are not effective for limiting the ingress of gasoline vapors, air or moisture. Gasoline vapors are extremely dangerous since only a small volume is sufficient to cause a fire when ignited by the electrical arcs within the distributor. Moreover, air and moisture entering the distributor cap may cause corrosion.

It is believed that this corrosion is caused by compounds of nitrogen which are formed during operation of the device. It is well known that an electrical discharge through air will cause the nitrogen and oxygen of the air to combine to form various nitrogen oxides. These oxides are not only extremely reactive themselves, but in the presence of water vapor they dissolve or react to form various corrosive acids of nitrogen. These acids of nitrogen when present in the atmosphere within the casing will corrode and may severely damage the electrical contact. Although only a small amount of nitrogen compounds may be produced by any one arc, considerable oxides and nitrogen and acidous nitrogen may be produced during long continued operation. These nitrogen compounds resulting from arcing have other undesirable effects. For example, the acids may form upon the walls of the distributor housing, wetting the wall surface, thereby reducing the surface dielectric strength which may result in short-circuiting and thus causing failure of the ignition system.

Many attempts have been made to improve conditions within a distributor. Some have approached this problem by including material within the distributor housing to keep the walls from reacting chemically with the nitrogen oxide formed therein.

Others may have attempted to provide a better seal for the chamber thereby further preventing the ingress of air moisture and gasoline vapors. However, these previous attempts to provide a better seal have proved unsatisfactory for at least two reasons. First, it is impossible to maintain and retain an absolutely perfect vacuum, and second, some means must be provided for the egress of nitrogen compounds generated during arcing so that they cannot cause corrosion in the chamber.

The present invention improves upon the concept of sealing the electrode chamber in a manner which provides vastly improved results.

SUMMARY OF THE INVENTION

According to the present invention there is provided a distributor cap having a pressure tight chamber at the top thereof, the chamber having located therein the contact from the electricity source, the contacts leading to the spark plugs and a rotating electrode mounted for distributing current from said source contact to the spark plug contacts. The chamber is formed by the upper end of the distributor cap and a horizontally extending plate which forms with the cap a closed pressure tight chamber. The rotor extends through the plate but is maintained in pressure tight relationship therewith to preserve the pressure tight integrity of the chamber. The lower end of the rotor is engaged with the driving shaft and rotated in the usual manner.

Although the chamber is made as pressure tight as possible, it is known from experience, that a perfect vacuum cannot be maintained. Therefore, according to the present invention means are provided for preventing the introduction of gasoline vapors, moisture and air from the atmosphere into the chamber. A fluid line 40 is connected to the chamber, and, depending upon the desired mode of operation, this line 40 is connected either to a source of inert gas under pressure or to a vacuum source such as the vacuum manifold on an internal combustion engine.

In the first situation the chamber is maintained under high pressure and filled with an inert gas. This inert gas will then tend to escape from the chamber thus preventing the ingress of gas vapor, air or moisture.

Alternatively, it may be desirable to operate the chamber under vacuum conditions. However, it is impossible to prevent all ingress of air, gasoline vapors or moisture. However, according to the present invention any gaseous products which do enter the chamber are immediately removed by a vacuum source. If the vacuum source is the engine manifold then a valve must be mounted between the chamber and the manifold to prevent air from flowing from the manifold to the chamber when the manifold is at atmosphere pressure.

According to another feature of the present invention the distributor cap is so constructed that it may replace the original cap of an existing distributor. To this end the sidewalls of the distributor cap extends downwardly from the chamber a sufficient distance to provide room for the timing mechanism in the existing distributor, and the length and construction of the rotor may be varied to be adapted to the driving mechanism of existing distributors.

Thus, it is an object of this invention to provide an improved distributor for internal combustion engines which eliminate many of the problems inherent in previous distributors.

It is another object of this invention to provide an improved distributor cap having a sealed electrode chamber formed therein and including a means for maintaining non-atmospheric conditions in the chamber for eliminating fire and corrosion in said chamber.

It is still another object of this invention to provide an improved distributor cap having a sealed electrode chamber therein and adapted to replace caps on existing distributors.

BRIEF DESCRIPTION OF THE DRAWINGS

Other objects and the attendant advantages of the present invention will become apparent from the detailed description to follow together with the accompanying drawings which show a preferred embodiment of the invention. However, it is to be understood that the detailed description and drawings are merely for purposes of illustration and are not intended to limit the scope of the invention.

In the drawings.

DESCRIPTION OF THE PREFERRED EMBODIMENT

Figure 1:
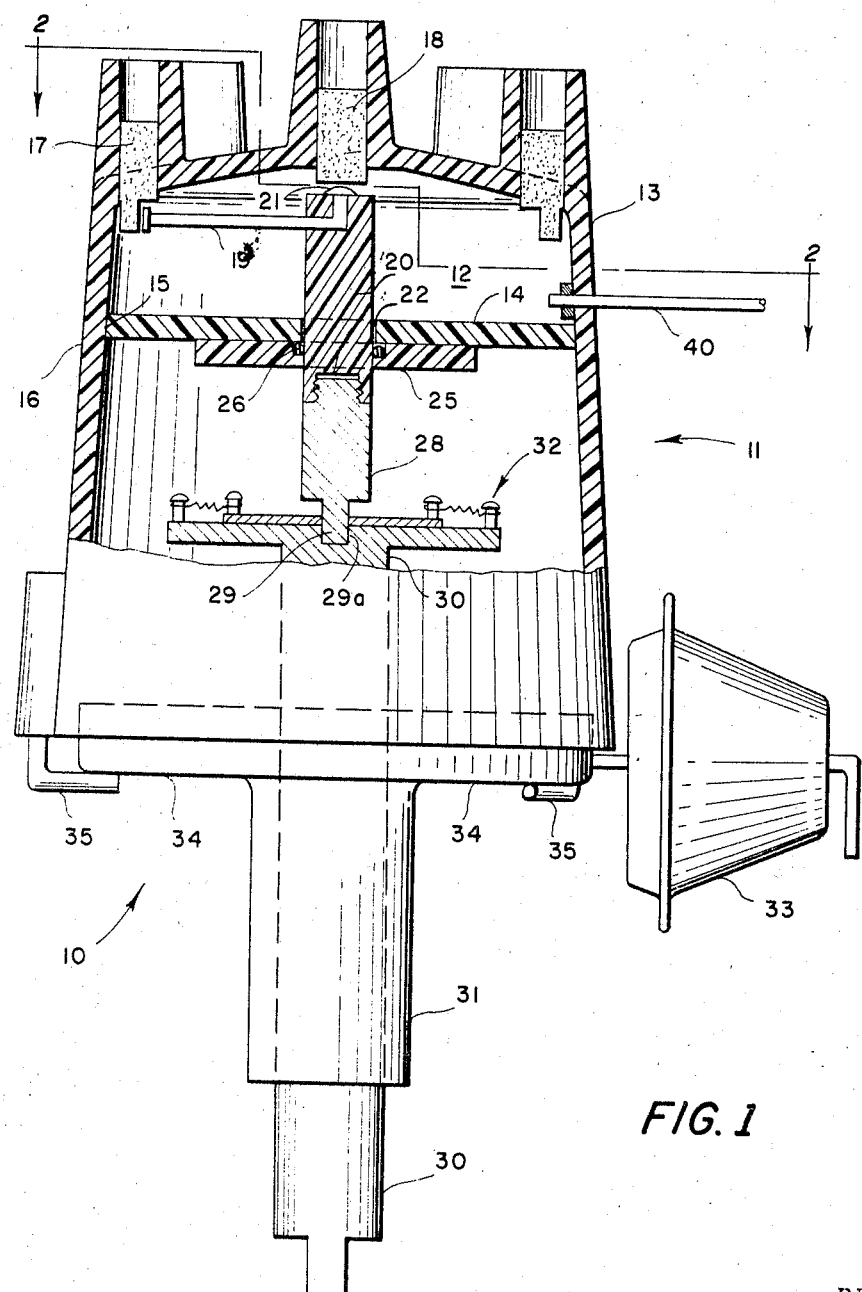
FIGURE 1 is a vertical elevation view partially in section, illustrating a distributor and a distributor cap according to the present invention.
Figure 2:
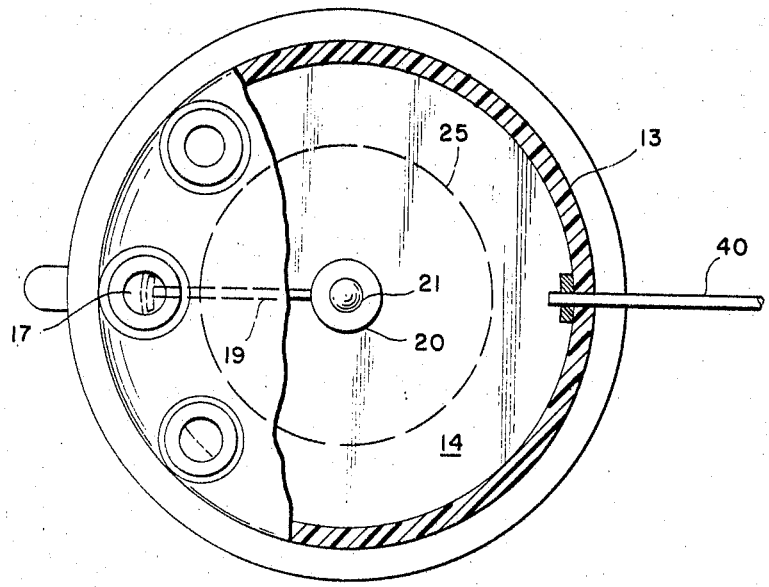
FIGURE 2 is a sectional view taken along lines 2—2 of FIGURE 1.

Referring to the drawings there is shown a distributor 10 having a distributor cap 11. A sealed electrode chamber 12 is formed between the upper portion 13 of the distributor cap and a plate 14 extending across the distributor cap. A permanent bond at 15 ensures an airtight seal between the wall 13 and plate 14.

A lower cap portion 16 extends downwardly from the upper portion 13 to enclose the timing mechanism of the conventional distributor. However, this wall portion 16 is not intended to provide an airtight seal for the area having the timing mechanism.

A plurality of spark plug contacts 17, mounted at the top of the cap 13, extend into the airtight chamber 12. An electrical source contact 18 extends centrally within the chamber. A rotating electrode 19 sequentially connects each spark plug contact 17 to the source contact 18. This electrode 19 is continuously in contact with source contact 18 through contact 21. The rotor 20, formed of insulating material, extends downwardly through an aperture 22 in plate 14. However, a sealing plate 25 having a sealing ring 26 mounted therein substantially prevents the flow of gas to or from the chamber 12 by way of the aperture 22.

The lower portion 28 of rotor 20 need not be of insulating material but should be fairly strong since it engages the driving mechanism. It includes an elongated tongue 29 (the width of which is visible in FIGURE 1) drivingly engagable in a complementary elongated slot 29a which is in turn integrally connected to a driving shaft 30.

Mounted on the driving shaft 30 is the conventional timing mechanism 32 including a vacuum advance means 33. However, since the timing mechanism forms no part of the present invention it will not be described in further detail.

The distributor cap 11 is held to the distributor base 31 by any suitable means such as pins 35 threadedly engaged in distributor cap 11 and extending beneath the flange portions 34 of distributor base 31.

An advantage of the present invention is that the distributor cap 11 including the plates 14 and 25 and rotors 20 and 28 can be formed and sold as a unit to replace the corresponding parts on conventional distributors already in use. To this end the lower cap portion 16 will provide an area to house any conventional timing mechanism while the lower rotor portion 28 may be modified to fit into driving engagement with the drive shaft of any conventional distributor.

The invention operates as follows. Current is delivered to the distributor at the source contact 18 from which the current is delivered along point 21 and electrode 19 sequentially to the spark plug contact 17, one contact being provided for each spark plug. Rotation of the rotor 20 is caused by rotating movement of the drive shaft 30 in the usual manner.

Figure 3:
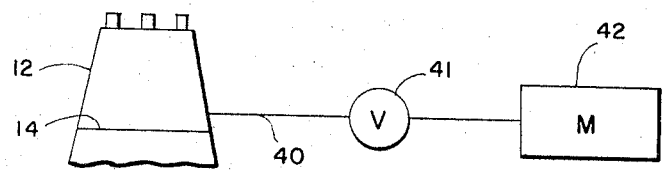
FIGURE 3 illustrates schematically one mode of operation of the invention.
Figure 4:
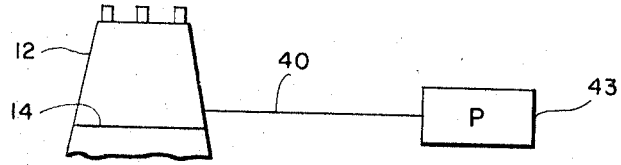
FIGURE 4 illustrates schematically another mode of operation of the invention.

Referring to FIGURES 3 and 4 there is shown schematically two possible modes of operation. First, it may be necessary or desirable to completely evacuate the chamber 12 thus operating the electrode in a vacuum. To assure removal of gases which may enter or be generated by arcing within chamber 12 during operation of the device, the chamber 12 is connected through a one-way valve 41 to a vacuum source such as the manifold 42 of the internal combustion engine. The one-way valve is necessary to prevent return of flow of gas from the manifold to the chamber 12 during periods when the manifold is not at sub-atmospheric pressure.

FIGURE 4 illustrates a second mode of operation. Here it is contemplated that the chamber 12 is placed under high pressure and filled with an inert gas, for example, argon. This gas would tend to seep outwardly through the openings thereby preventing the ingress of gasoline vapors, moisture or air from the atmosphere. A source of pressurized gas 43 ensures continued maintenance of the pressure within the chamber 12.

Although the invention has been described above in considerable detail with respect to a preferred embodiment thereof, it should be apparent to those skilled in the art that the invention is capable of numerous modifications and variations without departing from the spirit and scope of the invention as set forth in the appended claims.

I claim:

1. An ignition distributor for distributing current from a source contact to a plurality of secondary contacts including a cap and a plate permanently connected to said cap and forming therewith a permanently closed air-tight chamber, said source contact and said secondary contacts being located in said chamber, a rotor in said chamber and turning a shaft extending through the plate into the chamber, sealing means for providing an air-tight, pressure-tight seal between said rotor shaft and said plate, an electrode in the chamber mounted on said rotor and arranged to distribute electrical current from said source contact to said secondary contacts as the rotor rotates about its axis, and a means connecting the interior of the chamber to a vacuum source for maintaining a vacuum pressure in said chamber.

2. An ignition distributor as claimed in claim 1 wherein the last said means includes a fluid line adapted to connect said chamber to an automotive engine manifold for maintaining the chamber at a predetermined sub-atmospheric pressure, and a valve in the fluid line for controlling the flow of fluid from the chamber to the manifold.

3. A cap for an ignition distributor of the type employed for distributing current from a source contact to a plurality of secondary contacts, including a plate extending across and permanently connected to the cap to form a permanently closed air-tight chamber, said source contact and said secondary contacts being located in said chamber, a rotor in said chamber having a shaft extending through the plate into the chamber, sealing means for providing an air-tight seal between said rotor shaft and said plate, an electrode in the chamber mounted on said rotor and arranged to distribute electrical current from said source contact to said secondary contacts as the rotor rotates about its axis, a means connecting the interior of the chamber to a vacuum source for maintaining a vacuum pressure in said chamber, and said rotor shaft including a means outside of the chamber for connecting the rotor to a drive shaft to rotate the rotor.

References Cited

UNITED STATES PATENTS

| | | | |
|---|---|---|---|
| 2,207,368 | 7/1940 | Arthur | 200—19 XR |
| 2,415,510 | 2/1947 | Mallory | 200—19 XR |
| 2,619,513 | 11/1952 | Wolfenbarger | 200—19 XR |
| 2,923,785 | 2/1960 | Longenecker | 200—19 XR |

ROBERT K. SCHAEFER, *Primary Examiner.*

H. BURKS, *Assistant Examiner.*